United States Patent
Hickey et al.

(10) Patent No.: US 10,055,138 B1
(45) Date of Patent: Aug. 21, 2018

(54) TOPOLOGY AWARE I/O SCHEDULING FOR RAID STORAGE SYSTEMS

(71) Applicant: EMC IP Holding Company LLC, Hopkinton, MA (US)

(72) Inventors: Charles Hickey, Aptos, CA (US); Krishna Gudipati, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 157 days.

(21) Appl. No.: 14/872,515

(22) Filed: Oct. 1, 2015

(51) Int. Cl.
*G06F 3/06* (2006.01)
*G06F 12/0802* (2016.01)

(52) U.S. Cl.
CPC .......... *G06F 3/0611* (2013.01); *G06F 3/067* (2013.01); *G06F 3/0613* (2013.01); *G06F 3/0629* (2013.01); *G06F 12/0802* (2013.01); *G06F 2212/60* (2013.01)

(58) Field of Classification Search
CPC ... G06F 3/06–3/08; G06F 12/00–12/16; G06F 7/00–7/785
See application file for complete search history.

(56) References Cited

U.S. PATENT DOCUMENTS

| | | | |
|---|---|---|---|
| 5,448,709 A * | 9/1995 | Chandler | G06F 3/0601 710/52 |
| 6,606,629 B1 * | 8/2003 | DeKoning | G06F 11/1076 |
| 7,512,754 B1 * | 3/2009 | Chaitanya | G06F 3/0605 711/154 |
| 8,473,693 B1 * | 6/2013 | Muppalaneni | G06F 5/065 707/781 |
| 2013/0290601 A1 * | 10/2013 | Sablok | G06F 12/0246 711/103 |
| 2014/0173017 A1 * | 6/2014 | Takagi | H04L 67/06 709/213 |

* cited by examiner

*Primary Examiner* — Nicholas Simonetti
(74) *Attorney, Agent, or Firm* — Staniford Tomita LLP

(57) ABSTRACT

Embodiments are directed to a method of optimizing disk striping input/output (I/O) operations to an array of storage devices, by identifying an I/O request as a full stripe write request that stripes data across a plurality of storage devices of the array, converting the full stripe write request to a SCSI command block (CDB), and putting the SCSI command block in one of a stripe cache or a non-stripe cache that comprises a sorted linked list where each node of the linked list is a link to one of the plurality of storage devices.

17 Claims, 11 Drawing Sheets

TOPOLOGY AWARE I/O SCHEDULING FOR RAID STORAGE SYSTEMS

TECHNICAL FIELD

Embodiments are generally directed to data storage operations, and more specifically to optimizing full stripe writes and reads across several disks to improve throughput and decrease latency.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern data storage systems frequently employ hundreds or even thousands of HDDs (Hard-Disk Drives) and SSDs (Solid-State Drives) interconnected by high-speed busses such as Serial Attached SCSI (SAS). To improve both the reliability and performance of these components they are often grouped together into RAID (Redundant Array of Inexpensive Disks) configurations. RAID improves both reliability and performance by spreading data across multiple disks using a method known as "striping." Disk striping divides a set of data (e.g., file, folder, partition, etc.) and spreads the data blocks across multiple storage devices so that each stripe consists of the data divided across a set of hard disks or SSDs. A "stripe unit" refers to that portion of a stripe that resides on an individual drive; for example a stripe spanning 14 drives consists of 14 stripe-units, one per drive. The number of different drives depends on the configuration of the storage system, and the requirements of the applications. For example, in a Data Domain OS storage system (DDOS), such as that provided by EMC Corporation, the backup server can write to upwards of 14 RAID disks at a time.

Disk striping confers certain significant performance benefits to data storage systems. For example, an individual HDD might be able to sustain a sequential data transfer rate on the order of 100 MB/sec, but this can be multiplied to 1400 MB/Sec if transfers are conducted in parallel across a 14 disk array concurrently. However, the performance gains are highly dependent on optimized order and batching of the disk I/O (input/output) operations. For example, though a DDOS system may write to 14 disks at a time, these write requests often get shuffled with other write requests before they get transmitted out over the SCSI/SAS fabric, and this increases the amount of time a single full-stripe write must take. HDDs are even more performance limited when it comes to random operations because a recording head must be physically moved across a rotating disk, limiting such operations to often less than 20 per second. To optimize random operations it is important to allow those transfers to proceed free from the restrictions of striping and therefore independently on all the drives in the array. In this way a 14 drive RAID could support 280 concurrent random operations per-second. Examples have been described with respect to a specific implementation of a 14 drive DDOS system, but is should be noted here and throughout the description, that examples and embodiments apply to any other data storage system having a plurality of storage devices that stores data across a device array.

Modern file and database systems take advantage of RAID's dual-strengths by batching their writes and performing them sequentially (to take advantage of disk striping) while allowing random read operations to occur concurrently to each drive separately. As advanced as these methods are, the lower-level OS software that communicates with the disks themselves is ill-suited to handle both of these patterns simultaneously. This shortfall is further compounded by the fact that current OS software does not adequately take into account the unique performance characteristics that SAS bus topologies present when scaled up to address hundreds or thousands of disks.

In present RAID backup systems using disk striping, full-stripe writes typically do not yield their promised bandwidth increases, as performance gains typically drop off long before the available bandwidth is saturated. One issue with RAID is that full-stripe transfers can go no faster than the slowest disk. However, it is significant that much of the observed differences in drive performance are actually due to the way paths to these devices are shared, and not due to the disks themselves. Furthermore, it is apparent that current software scheduling algorithms that dispatch these requests to the drives do not handle these disparities properly. For these reasons, physical differences as small as 4% between disk drives has been observed to produce performance variations of over 2000% when measured at the application layer.

What is needed, therefore, is a system and method for keeping groups of writes to separate disks together from initiation in the RAID layer for transmission as a group over the SAS fabric to decrease the amount of time individual stripe writes take. Such a solution would improve data storage performance by taking both RAID and SAS bus topology considerations into account.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation of Hopkinton, Mass.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference. This includes U.S. patent application Ser. No. 14/500,485, filed on Sep. 29, 2014, and entitled "Automated Identification of the Source of RAID Performance Degradation."

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
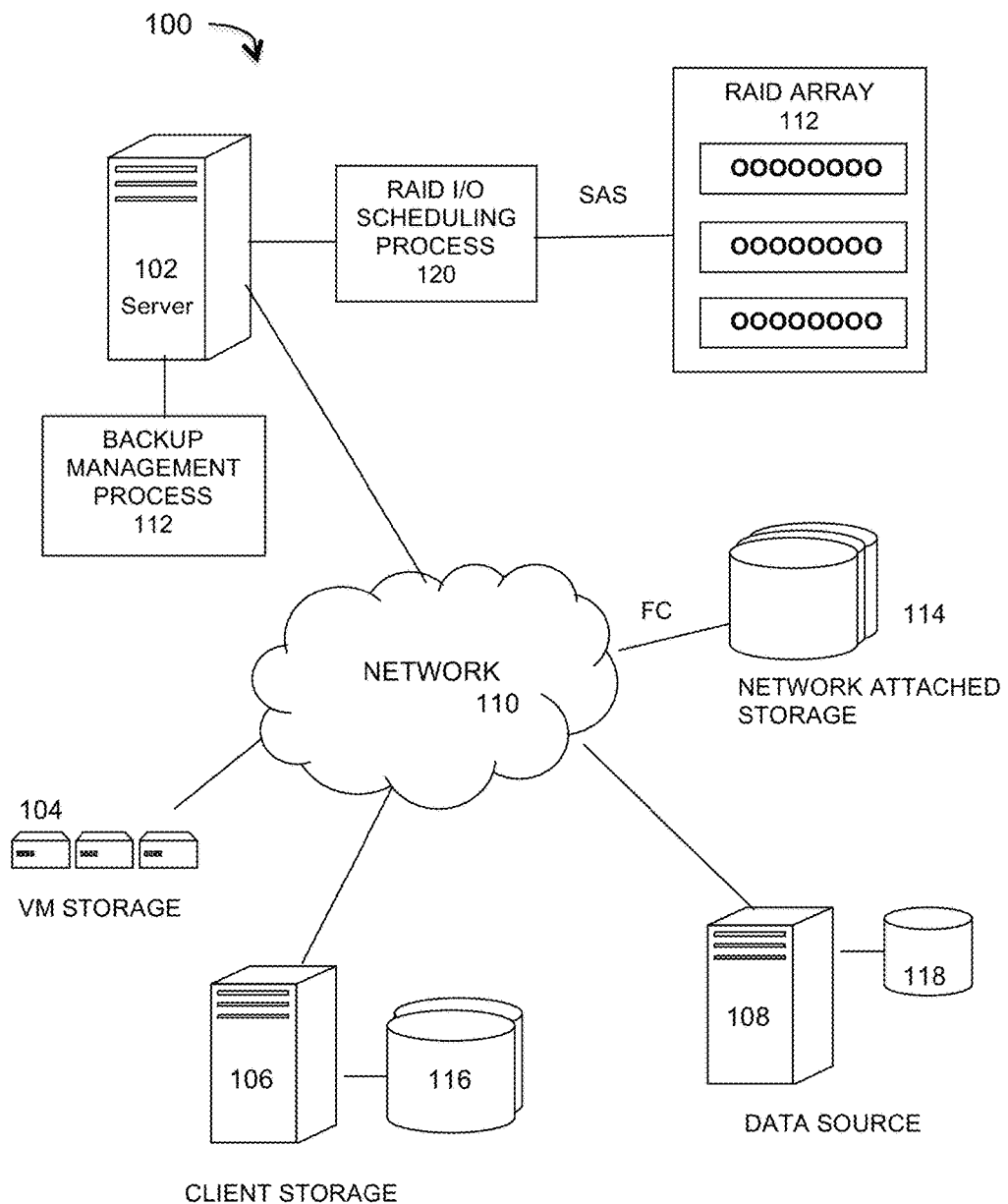
FIG. 1 illustrates a data storage system 100 that implements one or more embodiments of a topology aware I/O scheduler, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a processing component in or associated with a backup server or memory controller that optimizes memory accesses in a RAID storage system by forcing or facilitating full stripe accesses versus individual disk requests.

FIG. 1 illustrates a data storage system 100 that implements one or more embodiments of a topology aware I/O scheduler for data storage arrays, under some embodiments. As shown in system 100, one or more client computers 106 and 108 execute one or more applications that generate read/write requests to create and process data stored on data storage devices on the network. The client computer(s) may access the data storage devices through a network 110, such as the Internet, cloud, WAN, LAN, and other types of networks.

In system 100, a backup or storage server 102 executes a backup management process 112 that coordinates or manages the backup of data from one or more data sources (e.g., clients to the storage devices. The storage devices may serve as network storage devices or target storage devices for data backed up in large-scale data backup operations. In an embodiment, the server 102 may be coupled to an array or arrays of disks or memory devices and may be arranged in the form of multi-memory shelves, such as in enterprise or large-scale data storage facilities. This is illustrated in system 100 as RAID array 112, which shows a number of HDD or SSD shelves that each comprise a number of individual disks. Any practical number and arrangement of SSD, HDD, and respective shelves may be provided, and aspects of the I/O scheduling process may be scaled to work with single storage devices, medium size arrays, or large-scale mixed media arrays. As an example, a present embodiment may control a RAID array comprising 56 shelves with 15 4-Terabyte drives, though any other configuration is possible. Communication between server 102 and RAID array 112 may be over a SAS network, as shown, or any other appropriate network link.

Other target drives may include network attached storage (NAS) array 114 which is coupled to server 102 through network 110 or a Fibre Channel (FC) link, Virtual Machine (VM) storage 104, or local client storage 116.

The storage server and client computers may be coupled directly or indirectly to each other through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application; and the network may include one or more virtual machines (VMs) with each VM representing virtual clients that may be supported by one or more servers within each VM, or other type of centralized network server.

The data stored, accessed or processed by the client computers and the applications may be any appropriate type of data, such as database data that is part of a database management system. In this case, the data may reside on one or more storage devices and may be stored in the database in a variety of formats. One example is an Extensible Markup Language (XML) database, which is a data persistence software system that allows data to be stored in XML format. Another example is a relational database management system (RDMS) which uses tables to store the information. The data generated or sourced by system 100 is generally stored in any number of persistent storage locations and devices. The storage server 102 executes a backup process that causes or facilitates the backup of the application data the storage devices of the network, which may at least be partially implemented through RAID components of array 112. The storage server 108 may implement certain backup processes such as de-duplication processes. In an embodiment the storage server is embodied as a data domain replicator (DDR) device provided by EMC Corporation of Hopkinton, Mass. In an embodiment in which the storage systems is a DDR system, the RAID array is typically a RAID-6 array. Other embodiments may utilize other RAID systems, such as any of RAID-0 to RAID-5.

As stated above, with regard to the performance of individual disks as measured at the RAID layer, performance is significantly impacted as load is increased, and the impact is due more to data I/O scheduling rather than differences in individual disk performance. At low loads it has been seen in one test case that drives operate within 10-20% of each other. At high-loads the fastest drive may be on average twenty times faster than the slowest drive (e.g., 42.2 ms versus 992.2 ms for the example test case). However, performance measurements down at the SCSI level show that the actual difference in performance between drives remains constant, and this difference is due mostly to SAS bus arbitration. In a SAS system, each device has a unique defined address, and in the case of simultaneous I/O among drives, the drive with the lowest SAS address goes first. Therefore, the 1-2% variance between same-model drives is magnified by the way commands are queued and dispatched by the SCSI mid-level module.

What has been seen is that the depth of each queue for each drive under maximum load exhibits a tendency that the slightly faster drives have low access times (with empty queues) while a few drives have their queues full and have high access times. The slightly slower disks appear to RAID as being extremely slow because their queues stay full almost continuously. It has also been observed that under heavy load a full-stripe write to fourteen disks will get its stream of commands interleaved with the streams of other full-stripe writes such that the net duration for each is increased proportionately. Much the same thing has been observed happening on RAID storage systems under heavy load. Modern operating systems like Linux maintain a separate queue of requests for each disk. Deep per-disk queues are utilized to maximize throughput by keeping these modestly performing devices busy continuously. Even though full-stripe operations place commands into the top of the queues together, these commands invariably get pulled off the bottom in a scrambled order and favoring the fastest drives first, and this causes the slower drives to fall further in many instances.

In one embodiment, the I/O scheduling process prohibits or at least limits the interleaving of stripes to improve the flow of RAID traffic over complex SAS topologies. It uses the principle of keeping data stripes in single unitary processions and processing them in turn so that the average speed for all the processions is improved. For example, if a single procession can make the trip in time X, then four processions started at the same time and allowed to interleave evenly would all complete at about time 4X, and each group does not fully arrive at until they have all arrived in the event of even interleave of the sorting method. As a result each procession must take the maximum time, like all the others. If on the other hand, the precessions are grouped together and launched one after the other the first will finish at time 1X, the second at time 2X, the third at time 3X and the fourth at time 4X. The average time will now be (1+2+3+4)/4=2.5X, which is nearly a 40% improvement for each procession on average. As the number of processions, N, increases the savings by keeping the processions batched and launching them in series approaches N/2 for a maximum theoretical gain of 50%.

Preventing or limiting destructive interleaving is beneficial but further gains can be achieved by taking into account specific SAS topology and relative performances of each device/enclosure. For example, a slower disk could be given a head-start by dispatching I/O requests to it first to smooth the flow of data over the SAS interconnect (or 'fabric' comprising the statically configured mesh of nodes). Entire enclosures further down the chain could also receive a similar boost by favoring them over those enclosures that have higher priority under the SAS, or particular network protocol. Batching-up requests also has advantages on the back-end after the requests have completed, as the system can perform the end-of-task completion processing all as a single group.

Figure 2:
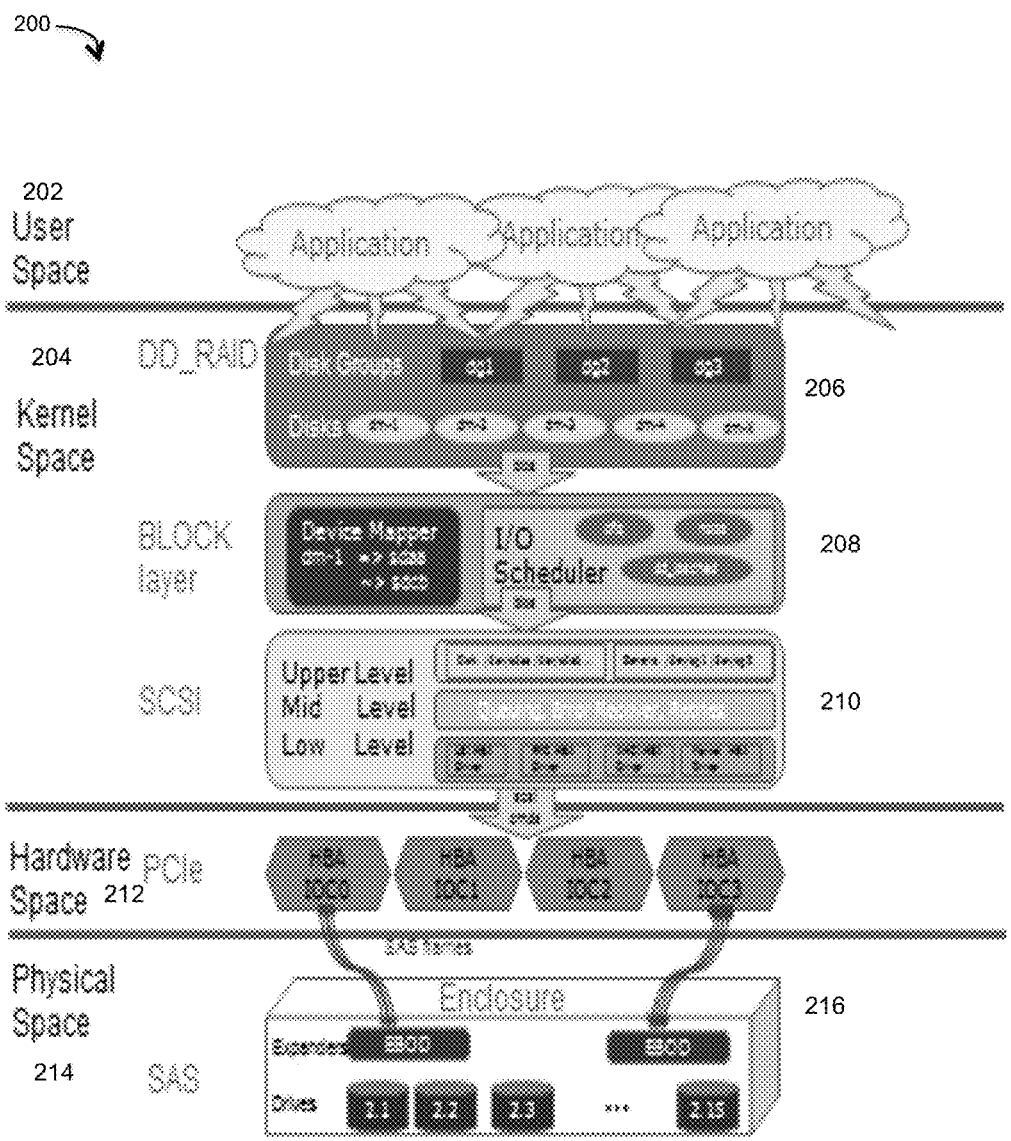
FIG. 2 illustrates an I/O stack that implements embodiments of an I/O scheduling process.

In an embodiment, the RAID I/O scheduling process 120 works within an I/O stack of the system software to optimize memory accesses by forcing or facilitating full stripe accesses versus individual disk requests. FIG. 2 illustrates an I/O stack 200 that implements embodiments of an I/O scheduling process. As shown in FIG. 2, stack 200 includes a top layer 202 that has applications that need to read and write data from the storage devices, and which is typically referred to as the "user space" of the stack. The user space 202 interacts with the kernel space 204 of the stack, which includes RAID module 206 that has a RAID layer 206 that sends data to a number of disks, grouped into disk-groups (dg). A block layer 208 of the kernel space submits I/O requests to certain lower layers that balance access to the devices between different applications. Block 210 is SCSI module that queues disk commands and includes at the I/O scheduler 210 to optimize disk striping aspects of the I/O requests. The kernel space 204 interacts with a hardware space 212 that includes SCSI host bus adapter (HBA) devices that are peripheral cards that operate according to the PCIe (Peripheral Component Interconnect Express) protocol to talk to the actual disk drives in physical space 214 over a multi-lane SAS cable. The physical box housing disk drives is shown as an enclosure and the drives or drive arrays are symbolized by cylinders.

For the embodiment of FIG. 2, the enclosure is fed by dual paths from the hardware space 212 to the physical space 214. This represents the specific dual-path topology associated with SAS buses. The SAS protocol allows drive enclosures to be daisy-chained together. The dual-path capability is used primarily to improve reliability through redundancy. This feature is made possible by the fact that most SAS disk-drives and their enclosures have a minimum of two data connections. If a cable or connection from one of these sources fails I/O traffic is routed over the alternate-path. A key performance consideration of note is that the disks in a RAID disk group may be fed by two different data-paths, which presents certain performance considerations that may need to be factored into any I/O optimization scheme. In a dual-path SAS scheme, a single enclosure communicates with two SAS ports. These ports are capable of communicating with all the drives, but software divides them into separate sets to better share the available bandwidth. Because the enclosures can also be daisy chained one after the other, such I/O performance is generally lower when communicating with disks further down the chain.

To solve the issue of interleaved data striping, as well as certain topography issues, the I/O scheduling module 210 generates queuing and submission of disk I/O requests based on both the higher level RAID subsystems, as well as the vagaries of the SAS topology and individual drive performance considerations down at the component level.

In general, three points present themselves for adding optimizations to the system: (1) in the block layer I/O scheduler by controlling when I/O requests are queued to individual drives; (2) in the SCSI mid-layer by reordering I/O requests already in their per-disk queues; and (3) at the bottom of the mid-layer and just before interfacing to the low level drivers (the HBA driver) that sends I/O requests out over the SAS interface.

Figure 3:
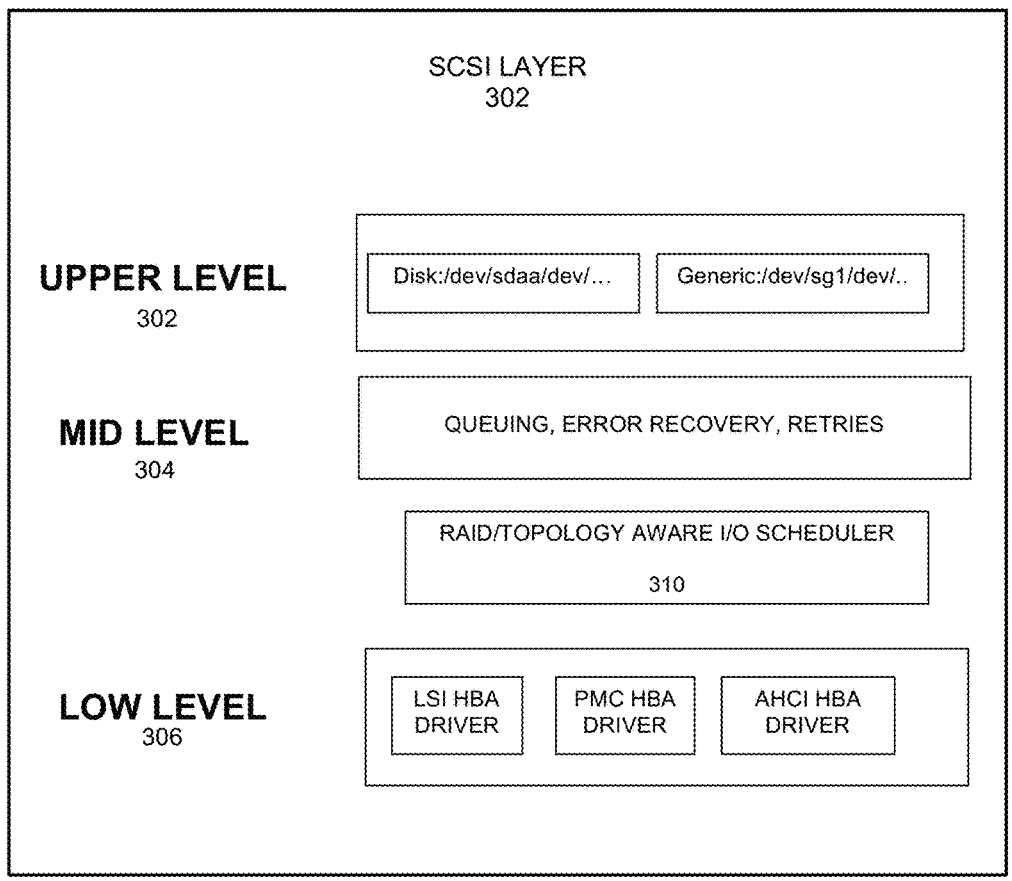
FIG. 3 is a functional block diagram illustrating a RAID/topology aware scheduler as part of the SCSI layer, under some embodiments.

Much work has been done on improving the I/O scheduler in the block-layer but these modules are focused mostly on fairly sharing access to the I/O devices by competing applications running in the user space. Traditional I/O schedulers then are too far removed from source of the problem. In an embodiment, the RAID I/O scheduling process 120 of FIG. 1 is positioned in the kernel space SCSI layer down where I/O commands are being readied for transmission out over the wire to the disks. FIG. 3 is a functional block diagram illustrating a RAID/topology aware scheduler (RTAS) 310 as part of the SCSI layer, under some embodiments. At least part of scheduler 310 corresponds functionally to scheduling process 120 of FIG. 1. As shown in FIG. 3, the SCSI layer 302 comprises three distinct levels or sub-layers referred to as the upper level 302 that includes specific disk definitions, the mid level 304 that includes queuing/error recovery/retry functions, and the low level 306 that includes specific HBA drivers. The RTAS 310 is positioned in the I/O stack between the mid and low levels at the point where I/O requests for all of the drives are being directed toward a single path for transmission one after the other down the wire. The main job of the RTAS is to separate and marshal stripe-oriented traffic and adjust for performance differences between components on the SAS bus. The RTAS takes as input a suboptimal stream of commands and outputs a stream of commands re-ordered for maximum stripe-based I/O efficiency.

In general, the RTAS system is used in conjunction with RAID storage systems because RAID assumes the responsibility of keeping read and write ordering semantics correct. Embodiments of the RTAS system may not work properly on normal I/O operations because RTAS changes the order of reads and writes, and so may cause problems.

The RTAS contains tables listing the active RAID disk groups, their association to specific disk drives, and the relative performance of each to the other as a result to their location in the SAS topology. The topology information centers on the SAS HBA device which typically has multiple SAS "ports," each of which corresponds to a physical connector and cable that runs out to one or more daisy chained enclosure of drives.

To enable RTAS functionality, one enhancement is required in the upper layers of the I/O stack. The SCSI CDB structures are tagged to specify if the specified transfer is part of full-stripe operation. If an incoming CDB is so tagged it is set aside to wait for its associated requests to arrive, and once the full stripe has fully arrived, it is shipped down the wire in sequence. Requests that have fallen behind are thus given a chance to catch up. When a full-stripe operation is ready for launch, a further boost is given to the requests to the disks that are indicated as being slow based on their Z-score, so that they get some degree of priority.

This I/O scheduling process is made possible by adding a delay to the inbound flow to the RTAS. Because empirical data indicates that imbalances develop gradually, it can be countered with a gentle corrective effort in the opposite direction applied continuously, and thus the added delay can be relatively minor. Other topology specific optimizations can also be performed such as providing a corrective bias for entire enclosures located further down a chain. Adjustments can also be made to smooth bandwidth demands by allowing non-stripe requests to proceed ahead when stripe-requests are pending, i.e., in progress on the drives.

With respect to the RTAS components, the RTAS provides two separate tree structured caches per SAS port, the stripe cache (SC) and the non-stripe Cache (NC). It also maintains a time-sorted list of all its visitors per SAS-port pair so that first-in first-out semantics largely apply (RAID tracks read and write command ordering such that the lower layers in the stack can re-order the submitted requests). In an embodiment, these caches are not static structures, but rather dynamic tree shaped data structures that shrink and grow as traffic ebbs and flows. Each entity in the tree represents a set of disk commands for a stripe write (e.g., a minimum of 14 for a 14 disk array). They are identified by the LBA (logical block address) of its disk location and disk-group id as passed down by the RAID several layers up in the stack.

Figure 4:
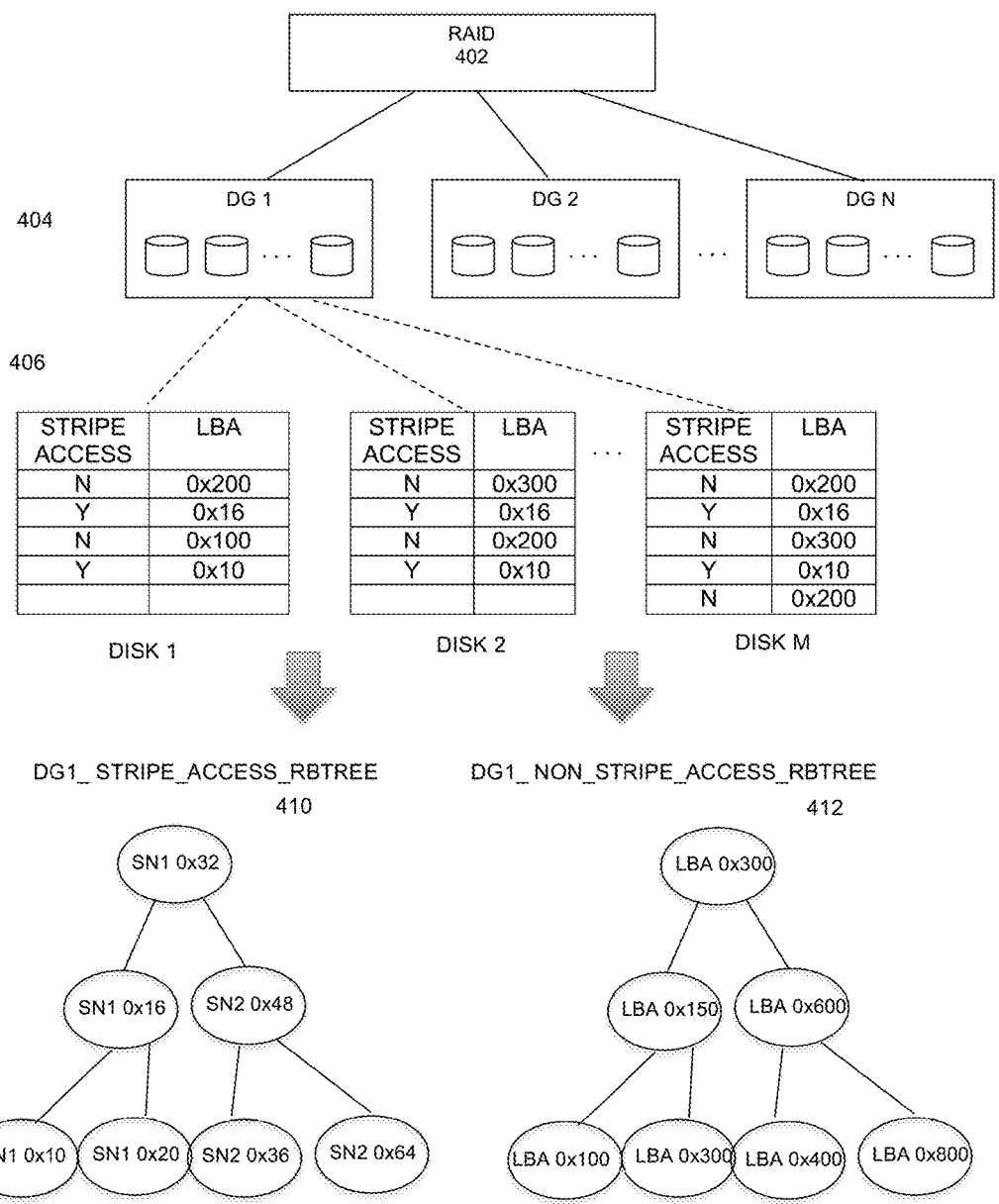
FIG. 4 illustrates an organization of RTAS functional components, under some embodiments.
Figure 5:
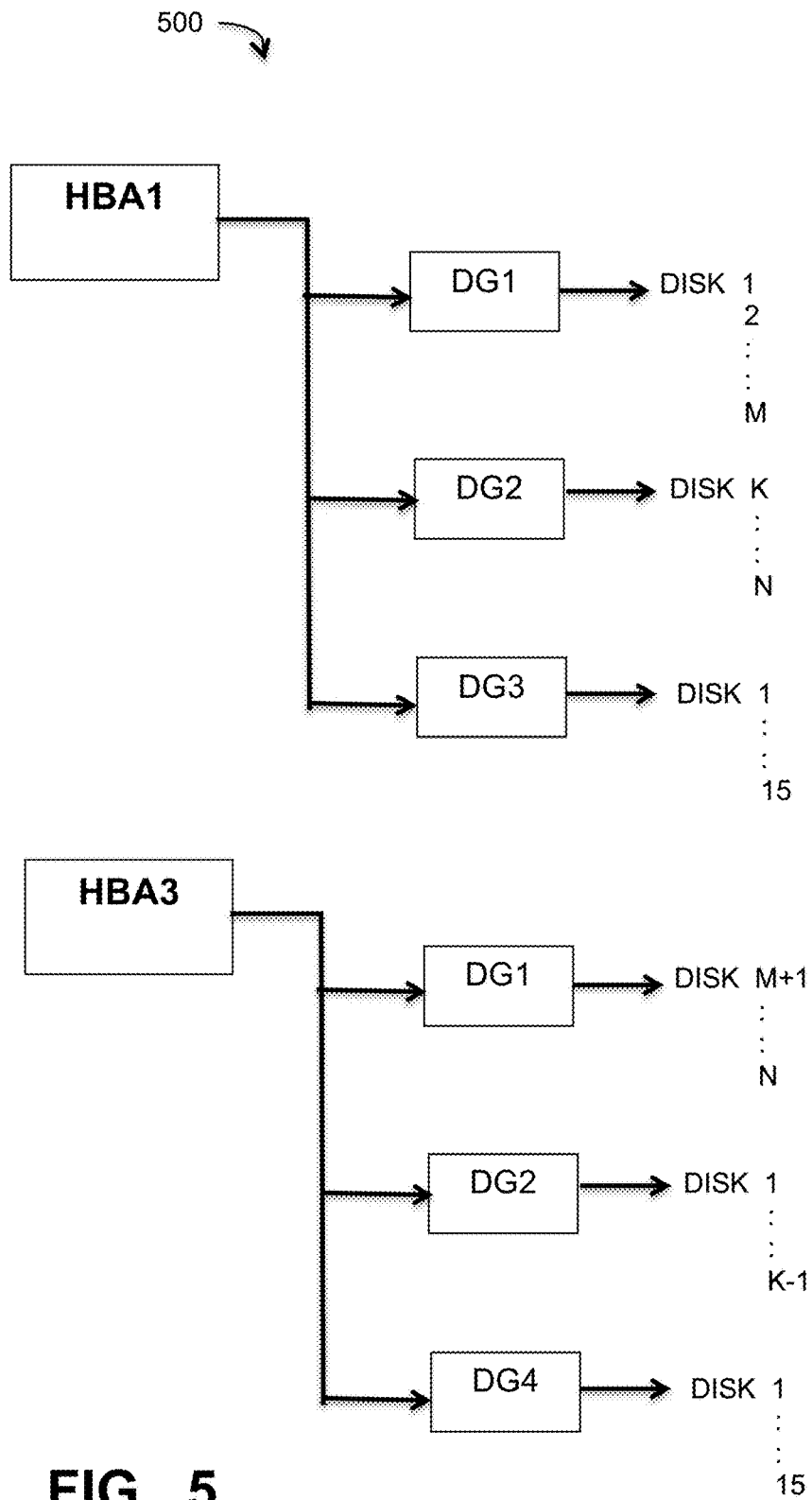
FIG. 5 illustrates the organization of disks and disk groups for each HBA for the RTAS structure of FIG. 4, under an embodiment.

FIG. 4 illustrates an organization of RTAS functional components, under some embodiments, and FIG. 5 illustrates the organization of disks and disk groups for each HBA for the structure of FIG. 4, under an embodiment. First with reference to FIG. 5, diagram 500 illustrates an example case of an HBA to disk group (DG) disk map for two HBAs, randomly denoted HBA1 and HBA3. HBA1 has 3 disk groups DG1 to DG3, each with a number of disks. Thus, DG1 has disks 1 to M, DG2 has disks K to N, and DG3 has disks 1 to 15. Similarly HBA3 has a number of disk groups and associated disks as shown. Each DG represents an enclosure and FIG. 5 illustrates an example linkage between each SAS port (HBA) and disk groups to disks.

As described above with respect to FIG. 3, the I/O stack is modified by inclusion of the RTAS module. As shown in FIG. 4 the RAID software module 402 is shown with its grouping of disks into disk groups 404, shown in the example of FIG. 4 as DG1, DG2, to DGN. Each disk group comprises a number of disks, as shown in FIG. 5. For the example of FIG. 4, DG1 has M disks 406, denoted DISK 1, DISK 2, to DISK M. For the embodiment shown, each disk 406 is actually the SCSI mid-layer queues, with one per disk, with each row being a queued SCSI command block (CDB), whether it is part of a stripe or not and its LBA. A CDB is a data structure that wraps a SCSI command according to known procedures. Each table 406 includes a number of queued requests, one per row, with the logical block address (LBA) corresponding to each request, where an LBA is the location on a block to which the stripe is written. Each table also includes a stripe access field that indicates whether the I/O request is part of a stripe or not, so N (No) indicates Non_Stripe_Access, and Y (Yes) indicates Stripe_Access. It should be noted that any other binary flag could be used as well.

For each DG, the RTAS allocates two caches (or buffers) one for the Stripe_Access_RBTree and one for the Non_Stripe_Access_RBTree. Thus, as shown in FIG. 4, two caches for DG1 are shown, one for the stripe-cache and the other for the non-stripe cache. These are used for independent, and typically small random reads. Each tree consists of the LBAs for the I/O request on each disk with striped requests going to the Stripe_Access_RBTree and non-striped requests going to the Non_Stripe_Access_RBTree.

In an embodiment, the caches are implemented as Red Black Trees, with each stripe unit node in the stripe cache tree having a Z-Score sorted request list. Functionality and operation of the Z-score sorting method is described in U.S. patent application Ser. No. 14/500,485, filed on Sep. 29, 2014, and entitled "Automated Identification of the Source of RAID Performance Degradation", and which is hereby incorporated by reference in its entirety.

Figure 6:
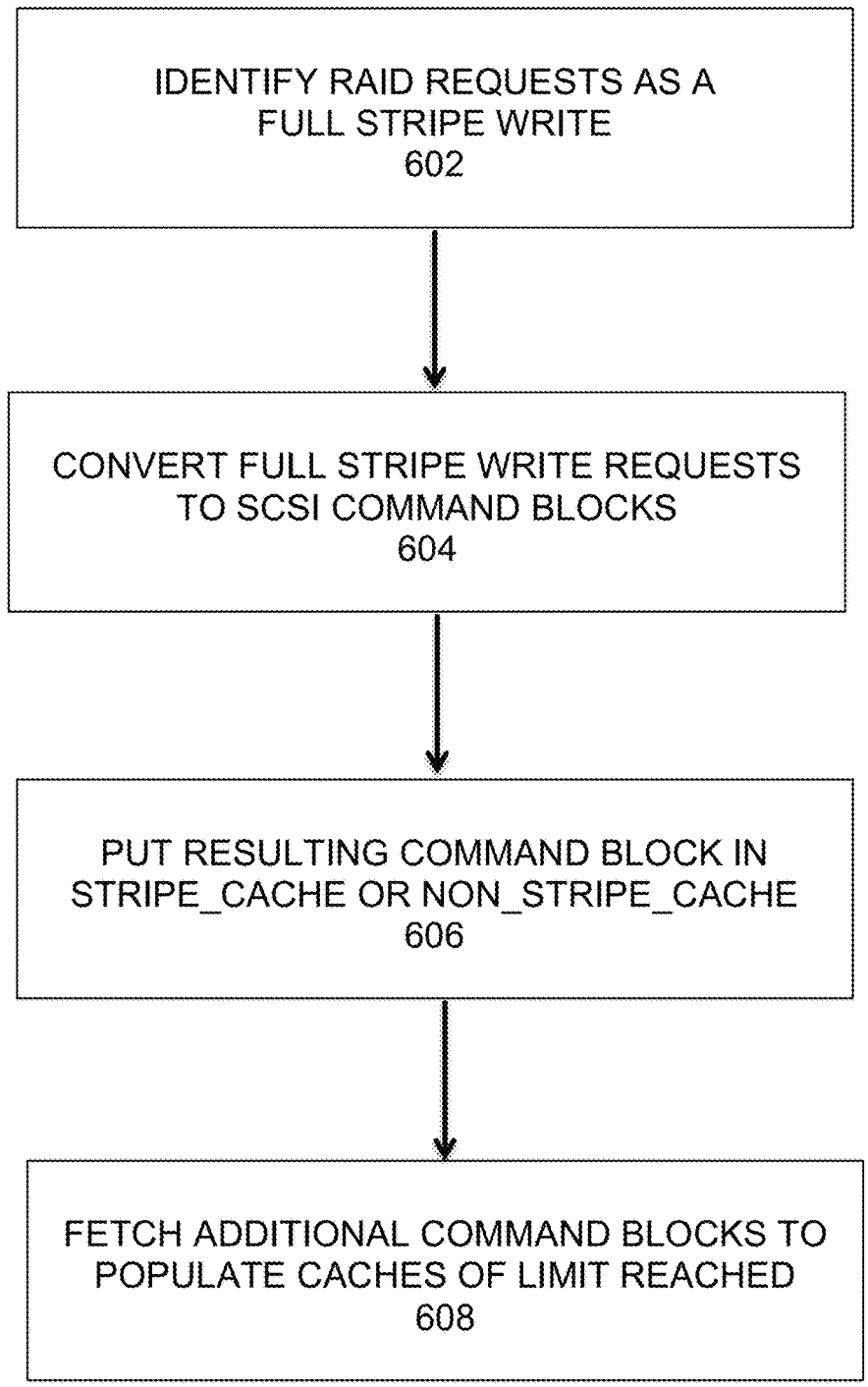
FIG. 6 is a flowchart that illustrates an RTAS control flow, under some embodiments.

FIG. 6 is a flowchart that illustrates an RTAS control flow, under some embodiments. As shown in FIG. 6, RAID requests that are part of a full stripe write are identified as such in the BIO structure used when submitting this request to the block layer for dispatch (e.g., up in DD_RAID layer 206), step 602. These pass through the block layer and are converted into the SCSI command blocks (CDB) in the SCSI driver 210, step 604. The SCSI CDB maintains a pointer back to the original BIO structure. Normally when a CDB is added to an empty queue from the higher layers control will pass down lower in the stack and result in the CDB being removed and submitted directly to the HBA driver's transmission queue for dispatch over the SAS bus. With the RTAS, however, the CDB will be removed from the queue and handed off to either the RTAS stripe-cache (SC) or the non-stripe-cache (NSC) directly depending on whether it is a stripe or non-stripe operation, step 606.

In general, there may be a defined limit as to the number of concurrent process or the amount of time for each process. For example, the system may be configured to allow for ten (or any similar number) to be running concurrently in a drive at a time, or impose a time limit (e.g., several seconds) for each operation. In present systems, when a CDB cannot be submitted to the HBA driver either because the driver or drive itself has reached the limit of the amount of requests it will take, the CDB will be left in the queue and a timer will be set. When the time out expires another attempt to submit it will be made. With the RTAS, when the number or timer limit is reached, the process goes to the queue and attempts to remove more CDBs to populate the caches, step 608.

Figure 7:
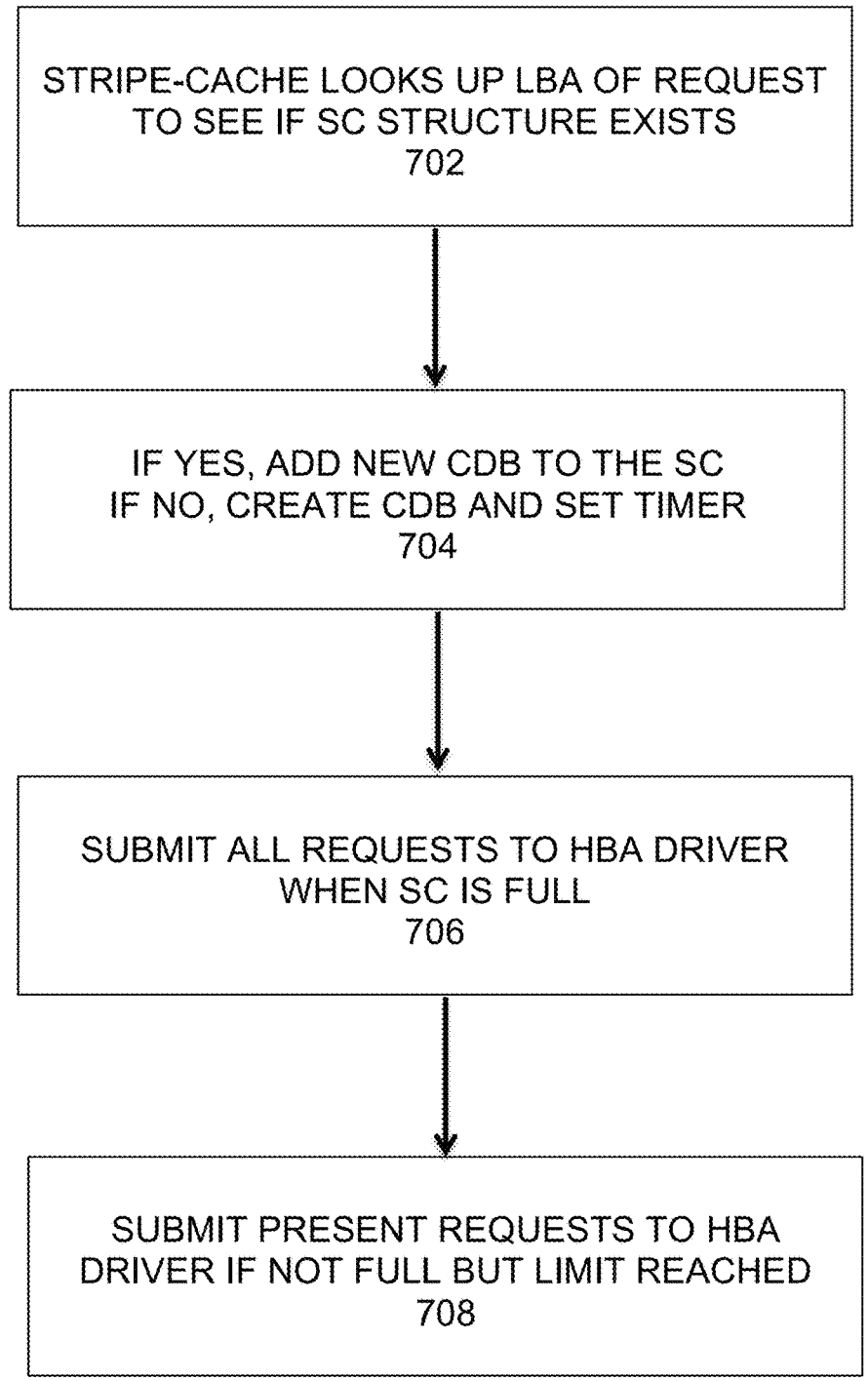
FIG. 7 is a flowchart that illustrates operation of the RTAS module for a two port case, under an embodiment.

In one embodiment, the stripe cache maintains a single cache structure for each pending full-stripe request, per SAS-port. If a RAID stripe is split between two ports, such as for the two ports of an HBA, then two such structures will exist, one for each SAS-port. FIG. 7 is a flowchart that illustrates operation of the RTAS module for a two port case, under an embodiment. As shown in FIG. 7, certain processing steps are performed when the stripe-cache is passed a CDB in the two port case. First, the SC looks up the logical block number (LBA) of the request in the cache RB tree to see if a stripe-cache structure exists for that LBA, 702. It should be noted that in RAID, all stripped requests even though they are to different disks are to the same location on these disks. The Red-Black tree is a standard Linux kernel data type that self-balances and allows O(log(n)) searches. If a stripe-cache does exist the new CDB is added to the stripe-cache, and if a stripe-cache does not exist, one is created and inserted in the tree, and a timer is set on this element, 704. If the cache is full, i.e., all the requests in the stripe are accounted for, the entire set is submitted to the HBA driver in the order of slowest first, 706. A partially full stripe cache may also be submitted to the lower level driver when the timer reaches a terminal count or a request number limit is reached, with the slowest drive first, 708.

In certain cases, the per-disk transfers can be of varying sizes and not necessarily exactly equal to that of a stripe unit. This raises a stripe-cache variable size transfer issue. This may be caused by the upper layer software passing down "splits" and "merges" for example. A split occurs when two or more commands are required to write a single stripe unit, and a merge occurs when one command is writing data for two or more successive stripes. In most cases there is exactly one CDB per disk stripe-unit transfer, but splits and merges can occur as well, and in various combinations.

Figure 8:
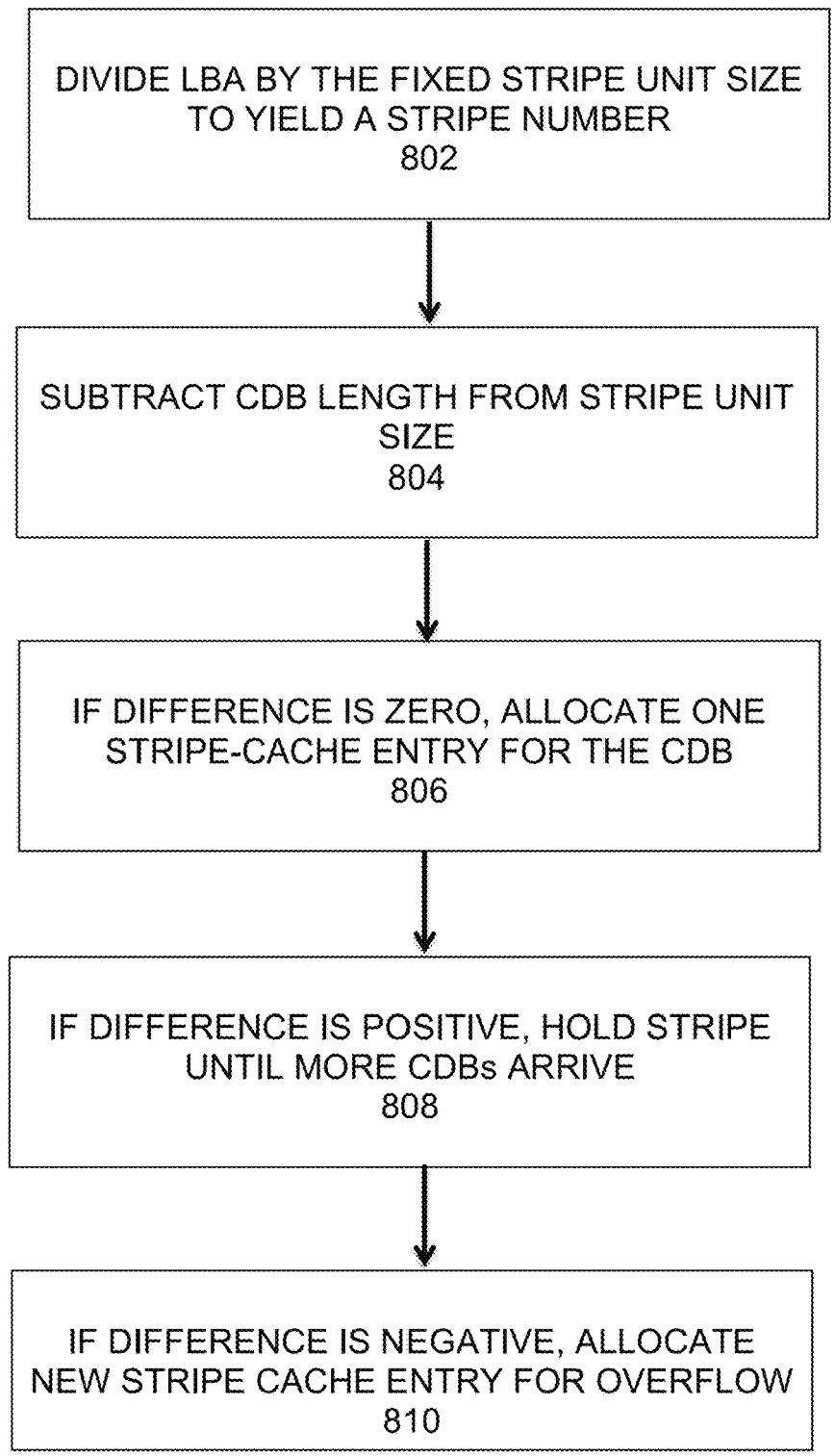
FIG. 8 illustrates a method of accommodating an incoming flow of varying sizes of CDBs, under an embodiment.

In an embodiment, the RTAS includes a component to address this uneven flow. FIG. 8 illustrates a method of accommodating an incoming flow of varying sizes of CDBs, including those that are equal to, smaller than, and larger than a given stripe unit size, under an embodiment. As shown in FIG. 8, the process begins for stripe-cache CDBs by dividing the LBA by the fixed stripe-unit size yielding a stripe-number (SN), 802. The CDB's length is then subtracted from the stripe unit size, 804. If the result is zero, the CDB is for exactly one stripe-unit, then one stripe-cache entry is located (or allocated if not found) for this SN and the CDB address is noted in that structure, 806. The difference between its size and stripe-unit is also recorded there (0 in this case). If the difference is positive then there is a remainder and the stripe must be held until one or more CDBs arrive for that required data, 808. If the difference is negative then there is a surplus, this stripe-unit's remainder is set to zero and a new stripe cache entry is allocated for the overflow with the remainder posted in this new allocated entry, 808. This process is repeated allowing full assembled stripe caches to be transmitted while others continue to accumulate their required components. Note that in the case of an overflow, where for example, SN #0 has a disk that contains a transfer to SN-#0 and SN-#1, SN-#0 will be dispatched while SN-#1 may still be awaiting for the arrival of additional commands For the RTAS non-stripe cache (NSC) 412 as illustrated in FIG. 4, similar processes as described above may be similarly followed and implemented. For the non-stripe cache, however, there is no need to coalesce identical logical blocks together. Rather the non-stripe cache is maintained to ensure fairness with the stripe cache (e.g., the system holds off some non-stripe requests to let some striped request through) and to allow the system to launch requests to slow devices and slow enclosures before fast devices and enclosures and to better smooth the flow of requests out over the bus.

Figure 9A:
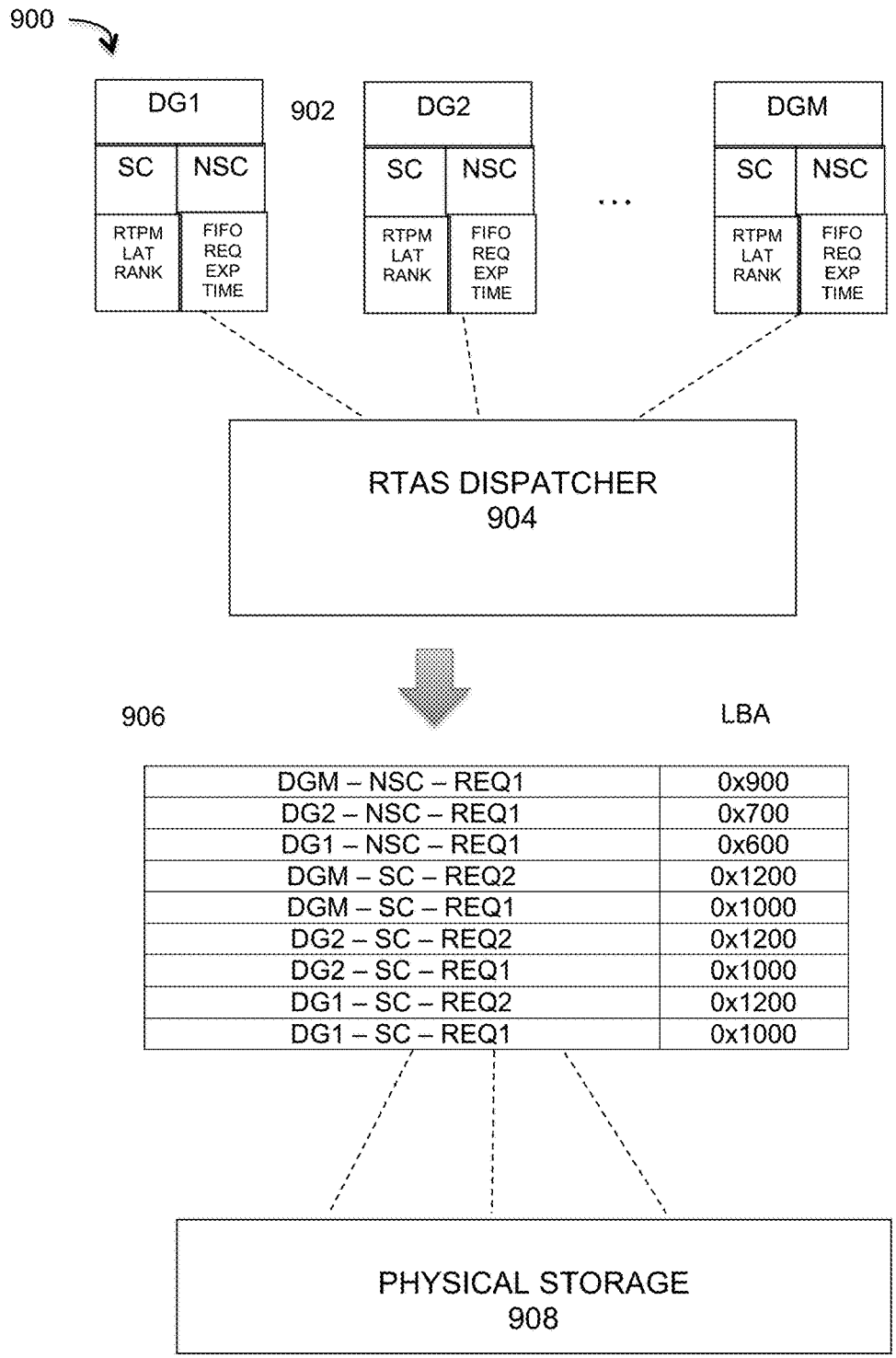
FIG. 9A illustrates functional components and example operation of an RTAS dispatcher, under some embodiments.

In an embodiment, the RTAS is initiated by an RTAS dispatcher kernel module. It executes in the context of many different threads, some of which may be part of a process. It maintains its own state in kernel memory and uses locks so that the actions of one thread executing in the same code does not corrupt the data of another thread. FIG. 9A illustrates functional components and example operation of an RTAS dispatcher, under some embodiments. As shown in diagram 900, the RTAS dispatcher 904 receives DG information 902 for each of the M disk groups. These data structures 902 include the SC and NSC entries, an RTPM_LAT_RANK, and a FIFO_REQ_EXPIRE_TIME. The dispatcher 902 generates an HBA I/O dispatch queue 906 that includes the dispatched requests for each disk group and the NSC or SC caches, and LBAs for each request. These are then sent to physical storage 908 when the appropriate caches are filled, or timeout/number limits are reached.

Figure 9B:
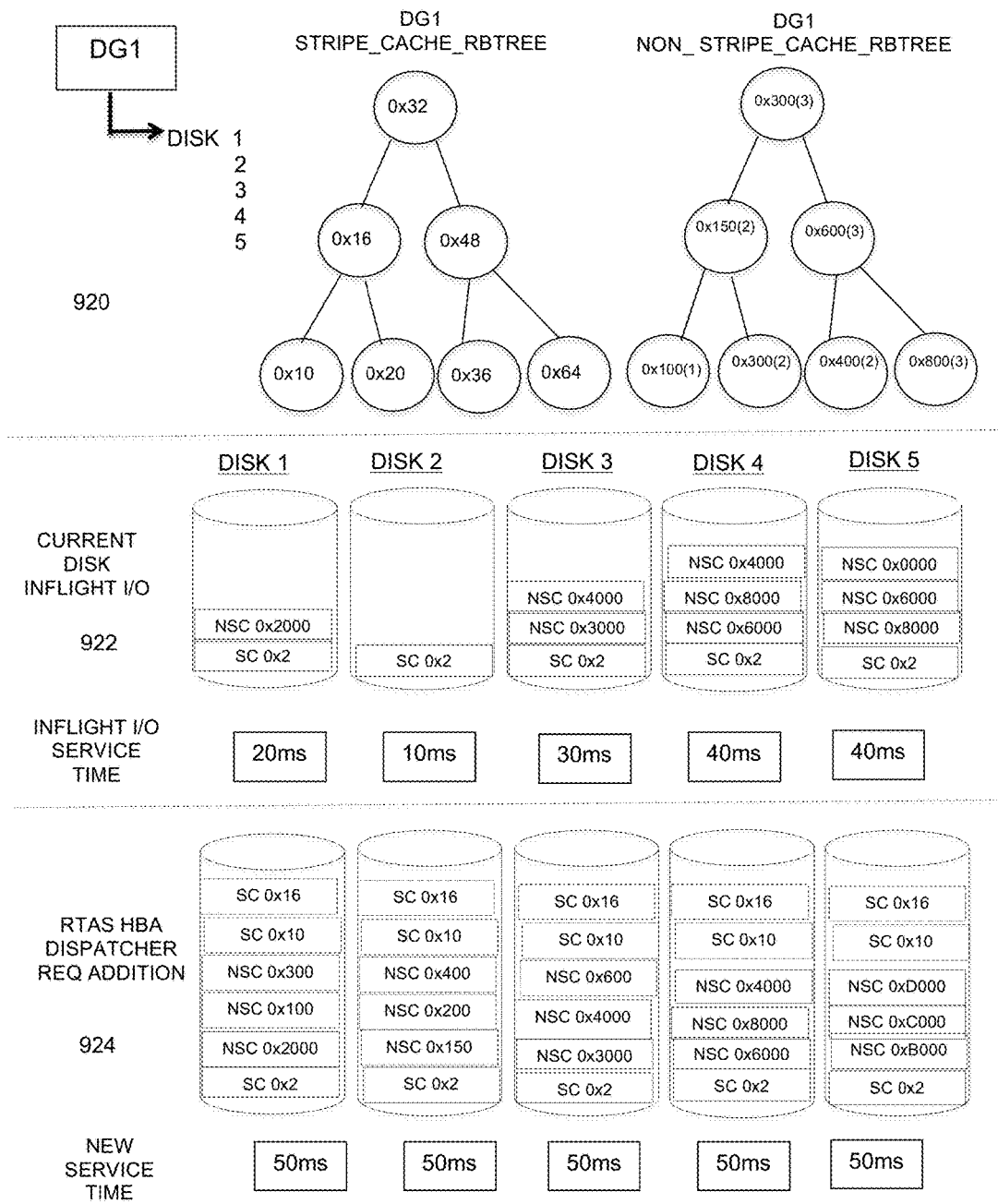
FIG. 9B illustrates functional components and example operation of an RTAS dispatcher showing example inflight service times, under some embodiments.

FIG. 9B illustrates functional components and example operation of an RTAS dispatcher showing example inflight service times, under some embodiments. As shown in FIG. 9B, layer 920 shows the organization of DG1 having disks 1-5, and the example trees for the stripe cache (SC) and non-stripe cache (NSC). Layer 922 provides some example caches for each of the five disks of DG1 for current disk inflight I/O operations, and some illustrative inflight I/O service times. For the example shown these times are: disk1 20 ms, disk2 10 ms, disk3 30 ms, disk4 40 ms, and disk5 40 ms. Layer 924 illustrates the addition of RTAS HBA dispatcher requests, so that each disk contains additional requests (shown as dashed boxes) over the original inflight I/O operations (shown as solid boxes). With this addition, the inflight service times are 50 ms for all five disks. FIG. 9B is intended for example only to show the effect on service time of adding requests through the TRAS HBA dispatcher.

Figure 10:
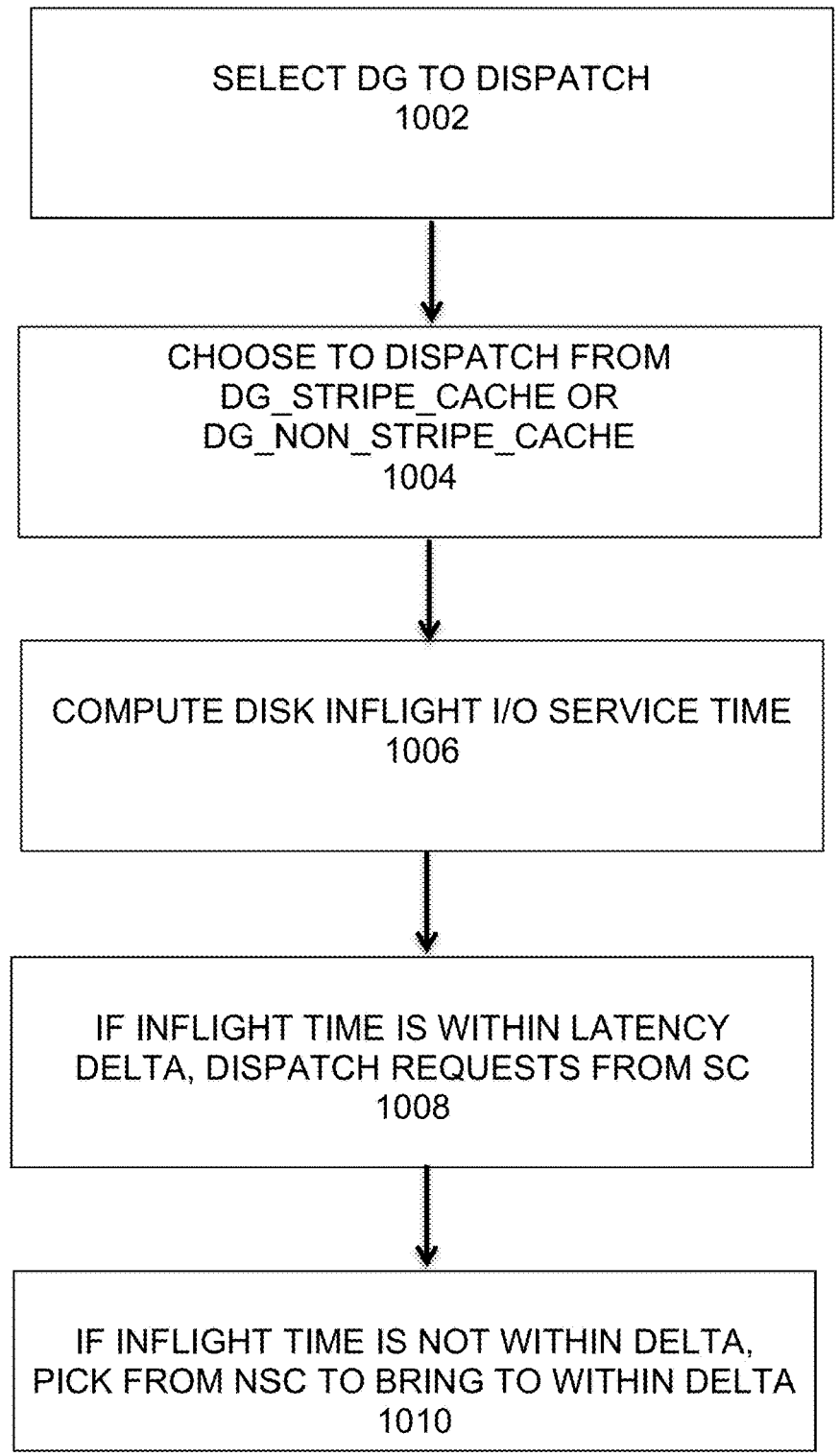
FIG. 10 is a flowchart that illustrates a method of dispatching an RTAS HBA, under some embodiments.

FIG. 10 is a flowchart that illustrates a functional method of the RTAS dispatch logic, under some embodiments. In general, the RTAS HBA dispatcher iterates over the list of DG's visible on a particular HBA. The dispatcher module begins with the selection of a particular DG to dispatch, 1002. The criteria for this selection is that the dispatcher will first pick a DG which is close to the request expiration or has waited more than an allowed threshold time. In case of similar request expiration times, the DG with the least RTPM rank (RAID/Topology Aware Performance Monitor Rank) is selected. A DG with the lowest RTPM rank has higher latency compared to other DGs, and could be at the end of the SAS chain. After selecting the DG to dispatch, the dispatcher chooses to dispatch from the DG_Stripe_Cache or the DG_Non_Stripe_Cache, 1004. With respect to dispatching from the selected DG, for each disk in DG, the dispatcher module computes the disk in-flight I/O service time, 1006. If the in-flight IO service times for all disks in DG are within a desirable allowed dispatch latency delta, the system proceeds to dispatch requests from the Stripe_Cache and dispatches the Stripe_Cache_Max_Dispatch number of I/O requests, 1008. In general, more dispatched requests are better since these are also sorted and would make the disk access sequential). If the in-flight I/O service times of all disks in DG are not within a desirable allowed dispatch latency delta, the system picks requests from the Non_Stripe_Cache_Node to try to bring the in-flight I/O Service times of all the disks to the desired latency delta, 1010. Once the in-flight I/O service times of all disks in DG are within a desired latency delta, the system iterates through the steps of the method. The RTAS HBA dispatcher can also consider the expiration time if specified for a request and consider this request as high priority during dispatches.

Embodiments of the RTAS module may be used with a RAID/Topology Aware Performance Monitor (RTAPM), which is a user program that monitors the relative performance of disk drives due to their own performance or the effects of their location in the SAS topology. It periodically updates the preference tables so that requests can be submitted to the slowest components first reducing skew in the completion time between devices.

Embodiments of the RTAS may also be implemented with, or used in conjunction with one or more load balancing processes to further optimize RAID I/O request throughput. For example either or both of a bandwidth load balancer or latency load balancer may be used.

Following is an example programming code segment for Queue Insertion into the SCSI layer, under an embodiment, and is intended for example only:

```
static void RTAS_raid_disk_req_insert(struct DISK_INFO *disk_info, struct IO_REQ
*io_req)
{
    struct HBA_INFO *dg_hba_info; /* HBA which has access to this DG/DISK */
    struct DG_INFO *disk_dg_info; /* DG corresponding to this Disk IO Request */
    struct DG_STRIPE_CACHE *dg_stripe_cache; /* DG Full Stripe Access Stripe Cache */
    struct DG_NON_STRIPE_CACHE *dg_non_stripe_cache;/* DG Non Stripe Access Cache */
    /* Obtain the DG_INFO from the DISK_INFO */
    disk_dg_info = disk_info->parent_dg_info;
    /* Obtain the HBA_INFO from the DISK_DG_INFO */
    dg_hba_info = disk_dg_info->parent_hba_info;
    /* Check if this IO_REQ is a full-stripe DG access request or NOT */
```

```
    if (io_req->IS_FULL_STRIPE_ACCESS) {
        /* Add this request to the RTAS DG Stripe-Cache (SC) */
        dg_stripe_cache = disk_dg_info->dg_stripe_cache;
        /* Perform Insert into the Stripe Cache */
        RTAS_insert_io_req_in_SC(dg_stripe_cache, io_req);
    } else {
/* This request is not a FULL_STRIPE_ACCESS - add to RTAS DG Non-Stripe Cache (NSC) */
        dg_non_stripe_cache = disk_dg_info->dg_non_stripe_cache;
        /* Perform Insert into the Non-Stripe Cache */
        RTAS_insert_io_req_in_NSC(dg_non_stripe_cache, io_req);
    }
}
```

Following is an example programming code segment for an RTAS module data structure, under an embodiment, and is intended for example only:

```
RTAS MODULE STRUCTURES:
struct DG_STRIPE_CACHE_NODE {
    STRUCT RB_NODE      RB_NODE;
    SECTOR_T            NODE_LBA_START;
    UNSIGNED INT        NODE_LBA_TRANSFER_LIMIT;
    UNSIGNED INT        IS_FULL_STRIPE_ACCESS_NODE;
    STRUCT LIST_HEAD    *NODE_REQ_LIST;
    UNSIGNED INT        NODE_REQ_CNT;
    UNSIGNED LONG       NODE_CREATE_TIME;
    UNSIGNED LONG       NODE_MAX_WAIT_TIME;
};
```

Following is an example programming code segment for insertion of a disk request into DG Stripe Cache (SC) or Non-Stripe Cache (NSC) under an embodiment, and is intended for example only:

```
static void RTAS_insert_io_req_in_SC(struct DG_STRIPE_CACHE *dg_stripe_cache, struct
IO_REQ *io_req)
{
    struct RB_ROOT *sc_rb_tree_root; /* Root of the Stripe Cache RB-Tree */
    struct RB_NODE *sc_rb_tree_parent_node; /* Temp Node - holds Parent Node
of a Node in RB-Tree */
    struct RB_NODE **sc_rb_tree_root_node; /* RB-tree Root Node */
    struct DG_STRIPE_CACHE_NODE *dg_sc_node; /* DG STRIPE CACHE NODE */
    struct DG_STRIPE_CACHE_NODE *dg_sc_node_new /* DG STRIPE CACHE NEW NODE */
    struct IO_REQ *partial_stripe_aligned_req; /* Partial IO_REQ in split cases */
    /* Get the root of the DG Stripe Cache RB-tree */
    sc_rb_tree_root = dg_stripe_cache->sc_rb_tree_root;
    /* Get the RB-tree Root Node */
    sc_rb_tree_root_node = &sc_rb_tree_root->rb_node;
    /**
    * Iterate over the RB-Tree and Find the optimal position for the IO_REQ -
    * IF a NODE exists and meets the criteria, add this IO_REQ to the NODE;
    * ELSE - create a new NODE and add it to the RB-Tree.
    */
    while (*sc_rb_tree_root_node) {
            sc_rb_tree_parent_node = *sc_rb_tree_root_node;
            dg_sc_node = RB_ENTRY(sc_rb_tree_parent_node, struct
DG_STRIPE_CACHE_NODE, RB_NODE);
            /**
            * Check if the IO_REQ LBA lies in the LBA Range supported by this cache node
            * If YES -- Add this io_reg to the cache node
            * If NO -- Continue with search, if not present on tree create new cache node.
            */
            if (io_req->LBA >= dg_sc_node->NODE_LBA_START &&
                    io_req->LBA < (dg_sc_node->NODE_LBA_START + dg_sc_node->
NODE_LBA_TRANSFER_LIMIT)) {
                /* Check if this io_reg is properly aligned to this stripe cache node */
                if (io_req->LBA == dg_sc_node->NODE_LBA_START &&
                    io_req->transfer_length == dg_sc_node->NODE_LBA_TRANSFER_LIMIT) {
                        /**
                        * Insert the io_req into this Stripe Cache Node --
                        * We perform a Z_SCORE (DISK SLOW INDICATOR) based insert into the
                        * Stripe Cache Node linked list.
                        */
                        RTAS_Z_SCORE_Sorted_IO_Req_List_Insert(dg sc node->NODE REQ LIST, io_req);
                } else {
                        /**
                        * IO_REQ LBA is in RANGE of this stripe cache node but its not aligned
                        * to this node. This could happen if the disk elevator has performed a
```

```
                              -continued

* merge of multiple IO, we need to split this io_reg and make the parital
* io_req's stripe cache node aligned and then add to this Stripe Cache Node list.
            */
RTAS_Split_IO_REQ_STRIPE_CACHE_UNIT_ALIGNED(io_req, partial_stripe_aligned_req);
            /**
            * Insert the partial stripe unit aligned request into the
            * Stripe Cache Node linked list.
            */
RTAS_Z_SCORE_Sorted_IO_Req_List_Insert(dg_sc_node->NODE_REQ_LIST,
partial_stripe_aligned_req);
        /* Perform RB-Tree check again to insert the other half of the IO_REQ */
                RTAS_insert_io_req_in_SC(dg_stripe_cache, io_req)
            }
        } else if (io_req->LBA > dg_sc_node->NODE_LBA_START) {
        /* If LBA is greater than root node LBA - search tree right child */
                sc_rb_tree_root_node = &(*sc_rb_tree_root_node)->rb_right;
        }else if (io_req->LBA < dg_sc_node->NODE_LBA_START) {
            /* If LBA is lower than root node LBA - search tree left child */
            sc_rb_tree_root_node = &(*sc_rb_tree_root_node)->rb_left;
        }
    }
    /**
        * If we are not able to insert the IO_REQ in the Stripe Cache Node List
        * we need to create a new Stripe Cache Node and add this io_req to this node.
        */
    if (!io_req->inserted) {
        /* Create a Stripe Cache Node */
        dg_sc_node_new = RTAS_CREATE_SC_NODE_NEW( );
        /* Insert Node into the Stripe Cache Tree */
        RTAS_Insert_Node_Into_SC(dg_sc_node_new, sc_rb_tree_root);
        /* Perform Z-Score Based sorted insert of the request into new node */
        RTAS_Z_SCORE_Sorted_IO_Req_List_Insert(dg_sc_node_new->NODE_REQ_LIST, io_req);
    }
}
static void RTAS_insert_io_req_in_NSC(struct DG_STRIPE_CACHE *dg_non_stripe_cache,
struct IO_REQ *io_req)
{
    /**
        * Insert the io_req into the Non-Stripe Cache Node --
        * We perform a Z_SCORE (DISK SLOW INDICATOR) based insert into the
        * Stripe Cache Node linked list.
        */
RTAS_Z_SCORE_Sorted_IO_Req_List_Insert(dg_nsc_node->NODE_REQ_LIST, io_req);
}
static void RTAS_raid_disk_req_insert(struct DISK_INFO *disk_info, struct IO_REQ
*io_req)
{
    struct HBA_INFO *dg_hba_info; /* HBA which has access to this DG/DISK */
    struct DG_INFO *disk_dg_info; /* DG corresponding to this Disk IO Request */
    struct DG_STRIPE_CACHE *dg_stripe_cache; /* DG Full Stripe Access Stripe Cache */
    struct DG_NON_STRIPE_CACHE *dg_non_stripe_cache; /* DG Non Stripe Access Cache */
    /* Obtain the DG_INFO from the DISK_INFO */
    disk_dg_info = disk_info->parent_dg_info;
    /* Obtain the HBA_INFO from the DISK_DG_INFO */
    dg_hba_info = disk_dg_info->parent_hba_info;
    /* Check if this IO_REQ is a full-stripe DG access request or NOT */
    if (io_req->IS_FULL_STRIPE_ACCESS) {
        /* Add this request to the RTAS DG Stripe-Cache (SC) */
        dg_stripe_cache = disk_dg_info->dg_stripe_cache;
        /* Perform Insert into the Stripe Cache */
        RTAS_insert_io_req_in_SC(dg_stripe_cache, io_req);
    } else {
/* This request is not a FULL_STRIPE_ACCESS add to RTAS DG Non-Stripe Cache (NSC) */
        dg_non_stripe_cache = disk_dg_info->dg_non_stripe_cache;
        /* Perform Insert into the Non-Stripe Cache */
        RTAS_insert_io_req_in_NSC(dg_non_stripe_cache, io_req);
    }
}
```

Embodiments are generally described herein with respect to RAID storage systems. Such systems may employ any number of RAID levels with respect to fault tolerance and redundancy. Nominally, a RAID 6 level is used, though any other RAID level (e.g., RAID0 to RAID5, or other) may be used. Moreover, the data storage array may be a non-RAID array, and may be any array of two or more storage devices across with stripes of data are stored.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of optimizing disk striping input/output (I/O) operations to an array of storage devices in a network, comprising:
   identifying an I/O request as a full stripe write request that stripes data across a plurality of storage devices of the array;
   converting the full stripe write request to a SCSI command block (CDB);
   tagging the CDB of the full stripe write request to indicate it as part of a full-stripe operation;
   setting aside the CDB to wait for associated requests to arrive for transmission in sequence after all the associated requests have arrived;
   putting the SCSI command block in one of a stripe cache or a non-stripe cache that comprises a Red Black Tree, with each stripe unit node in the stripe cache tree having a Z-Score sorted request list; and
   giving priority to the CDB and the associated requests if its Z-score is slow relative to other CDBs.

2. The method of claim 1 wherein the array of storage devices comprises a RAID array, and further comprising adding a delay to the other CDBs in a continuous gradual manner to counter imbalance in processing incoming requests to the storage devices.

3. The method of claim 2 wherein network comprises a Serial-Attached SCSI (SAS) network.

4. The method of claim 3 wherein the storage devices comprise one of a set of hard disk drives (HDD) or solid state drives (SDD) coupled to a backup server over the network, and wherein the RAID array conforms to a RAID6 system.

5. The method of claim 4 wherein the storage devices are organized into one or more enclosures, each enclosure representing a host bus adapter device having two SAS ports for data communication over the network, and further comprising adding a corrective bias to the incoming requests for enclosures located further along the network to additionally counter the imbalance.

6. The method of claim 1 wherein the stripe cache and non-stripe cache are each dynamic, hierarchical tree structures that are populated in accordance with I/O request traffic over the network.

7. The method of claim 6 wherein each node in a tree-structure represents a set of disk commands for a stripe write, and is identified by a logical block address of a disk location and disk group identifier.

8. The method of claim 7 wherein the stripe cache and non-stripe cache are maintained by a RAID aware scheduler that functionally resides in a SCSI layer of kernel space of an I/O stack for an operating system executed by a storage system server computer.

9. A method of optimizing disk striping input/output (I/O) operations to an array of storage devices in a network, comprising:
   intercepting I/O request traffic between a SCSI queuing layer and a SCSI host bus adapter layer, the I/O request traffic comprises I/O requests for a plurality of disks in the array that are directed toward a single path for sequential transmission over the network;
   tagging the I/O requests of full stripe write requests to indicate them as part of a full-stripe operation;
   converting the I/O requests into corresponding SCSI command blocks (CDB);
   setting aside CDBs of the tagged I/O requests to wait for associated requests to arrive for transmission in sequence after all the associated requests have arrived;
   routing stripe-oriented requests to a stripe buffer and non-stripe oriented requests to a non-stripe buffer, wherein a stripe comprises data for an operation distributed among the plurality of storage devices in the array, and wherein each stripe unit node in a stripe buffer tree has a Z-Score sorted request list; and
   executing requests from one of the stripe buffer or non-stripe buffer until one of an expiration of a timer or count limit, and execution of a full stripe, giving priority to CDBs whose Z-scores are slow relative to other CDBs.

10. The method of claim 9 wherein the routing and execution effectively re-order the I/O requests for optimal I/O request efficiency.

11. The method of claim 10 further comprising at least one of: adding a delay to the other CDBs in a continuous gradual manner to counter imbalance in processing incoming requests to the storage devices, or adding a corrective bias to the incoming requests for enclosures located further along the network to additionally counter the imbalance.

12. A system for optimizing disk striping input/output (I/O) operations to an array of storage devices in a network, comprising:
    a first component identifying an I/O request as a full stripe write request that stripes data across a plurality of storage devices of the array; and
    a second component converting the full stripe write request to a SCSI command block (CDB), tagging the CDB of the full stripe write request to indicate it as part of a full-stripe operation, setting aside the CDB to wait for associated requests to arrive for transmission in sequence after all the associated requests have arrived, putting the SCSI command block in one of a stripe cache or a non-stripe cache that comprises a sorted linked list where each node of the linked list is a link to one of the plurality of storage devices, and giving priority to the CDB and the associated requests if its Z-score is slow relative to other CDBs.

13. The system of claim 12 wherein the array of storage devices comprises a RAID array, and wherein network comprises a Serial-Attached SCSI (SAS) network, and further wherein the second component adds at least one of: a delay to the other CDBs in a continuous gradual manner to counter imbalance in processing incoming requests to the storage devices, or a corrective bias to the incoming requests for enclosures located further along the network to additionally counter the imbalance.

14. The system of claim 13 wherein the storage devices comprise one of a set of hard disk drives (HDD) or solid state drives (SDD) coupled to a backup server over the network, and wherein the RAID array conforms to a RAID6 system.

15. The system of claim 14 wherein the storage devices are organized into one or more enclosures, each enclosure representing a host bus adapter device having two SAS ports for data communication over the network.

16. The system of claim 12 wherein the stripe cache and non-stripe cache are each dynamic, hierarchical tree structures that are populated in accordance with I/O request traffic over the network, and wherein each node in a tree-structure represents a set of disk commands for a stripe write, and is identified by a logical block address of a disk location and disk group identifier.

17. The system of claim 16 wherein the stripe cache and non-stripe cache are maintained by a RAID aware scheduler that functionally resides in a SCSI layer of kernel space of an I/O stack for an operating system executed by a storage system server computer.

* * * * *